(12) United States Patent
Chiba et al.

(10) Patent No.: US 10,929,624 B2
(45) Date of Patent: Feb. 23, 2021

(54) PORTABLE TERMINAL, IMAGING DEVICE AND READING DEVICE

(71) Applicant: CASIO COMPUTER CO., LTD., Tokyo (JP)

(72) Inventors: Yasunori Chiba, Tachikawa (JP); Satoshi Ogasawara, Akishima (JP); Shinya Okumura, Kusatsu (JP); Yoshiaki Mochizuki, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/039,603

(22) Filed: Jul. 19, 2018

(65) Prior Publication Data

US 2019/0026515 A1 Jan. 24, 2019

(30) Foreign Application Priority Data

Jul. 20, 2017 (JP) .............................. JP2017-141289

(51) Int. Cl.
*G06K 19/00* (2006.01)
*G06K 7/10* (2006.01)
*G06K 7/14* (2006.01)

(52) U.S. Cl.
CPC ..... *G06K 7/10722* (2013.01); *G06K 7/10881* (2013.01); *G06K 7/1413* (2013.01)

(58) Field of Classification Search
CPC ........... G06K 7/10881; G06K 7/10386; G06K 2007/10534; G06K 7/10722;

(Continued)

(56) References Cited

U.S. PATENT DOCUMENTS 5,477,043 A * 12/1995 Dvorkis ............. G06K 7/10564
235/462.36
5,786,585 A 7/1998 Eastman et al.
(Continued)

FOREIGN PATENT DOCUMENTS

CN 101887953 A 11/2010
JP H08507887 A 8/1996
(Continued)

OTHER PUBLICATIONS

Related U.S. Appl. No. 16/039,528; First Named Inventor: Yasunori Chiba; Title: "Portable Terminal"; filed Jul. 19, 2018.
(Continued)

*Primary Examiner* — Matthew Mikels
(74) *Attorney, Agent, or Firm* — Holtz, Holtz & Volek PC (57) ABSTRACT

A portable terminal including a grip section provided as one end of a terminal main body and capable of being gripped by one hand of a user in a gripping style where the user places the thumb on a first surface of the terminal main body and holds a second surface on the rear side thereof by the index and middle fingers, in which the second surface has a first raised portion provided such that a first vertex portion is positioned between the index and middle fingers, and a second raised portion having a second vertex portion such that the index finger is interposed between the first and second vertex portions, and in which a switch section is provided such that a pressing target portion is exposed to a sloped surface area of the second raised portion on a side opposite to a side where the index finger is positioned.

20 Claims, 8 Drawing Sheets

(58) Field of Classification Search
CPC .... G06K 7/1413; G06K 7/1417; G08C 17/00; G08C 2201/32
USPC ................................ 235/435, 439, 454, 462
See application file for complete search history.

(56) References Cited

U.S. PATENT DOCUMENTS

| | | | |
|---|---|---|---|
| 5,801,918 | A | 9/1998 | Ahearn et al. |
| 6,637,662 | B2 | 10/2003 | Itou et al. |
| 7,450,968 | B2 | 11/2008 | Jung |
| 7,775,438 | B2 | 8/2010 | Beckhusen et al. |
| 7,839,632 | B2 | 11/2010 | Matsui et al. |
| 8,254,114 | B2 | 8/2012 | Lin |
| 8,730,155 | B2 | 5/2014 | Araki et al. |
| 8,814,049 | B2 | 8/2014 | Lee et al. |
| 2002/0023961 | A1 | 2/2002 | Itou et al. |
| 2008/0084654 | A1 | 4/2008 | Gerich |
| 2008/0148523 | A1* | 6/2008 | MacGregor ........ G06K 7/10881 16/430 |
| 2009/0002926 | A1* | 1/2009 | Matsui ............... G06K 7/10881 361/679.56 |
| 2010/0290177 | A1 | 11/2010 | Lin |
| 2010/0302140 | A1 | 12/2010 | Araki et al. |
| 2012/0088547 | A1 | 4/2012 | Lee et al. |
| 2014/0014726 | A1 | 1/2014 | Tsiopanos et al. |
| 2016/0064874 | A1 | 3/2016 | Meguro et al. |
| 2018/0084654 | A1 | 3/2018 | Meguro et al. |
| 2018/0217638 | A1 | 8/2018 | Ohtaka et al. |
| 2019/0082041 | A1 | 3/2019 | Chiba |

FOREIGN PATENT DOCUMENTS

| | | |
|---|---|---|
| JP | H10112891 A | 4/1998 |
| JP | H11203394 A | 7/1999 |
| JP | 2001060999 A | 3/2001 |
| JP | 2002074261 A | 3/2002 |
| JP | 2003030602 A | 1/2003 |
| JP | 2004252600 A | 9/2004 |
| JP | 2004322661 A | 11/2004 |
| JP | 2005027335 A | 1/2005 |
| JP | 2009009195 A | 1/2009 |
| JP | 2009009196 A | 1/2009 |
| JP | 2009282761 A | 12/2009 |
| JP | 2010277508 A | 12/2010 |
| JP | 2010282469 A | 12/2010 |
| JP | 2011107824 A | 6/2011 |
| JP | 2012027923 A | 2/2012 |
| JP | 2012130025 A | 7/2012 |
| JP | 2013156752 A | 8/2013 |
| JP | 2014085684 A | 5/2014 |
| WO | 9414136 A1 | 6/1994 |

OTHER PUBLICATIONS

Related U.S. Appl. No. 16/039,550; First Named Inventor: Yasunori Chiba; Title: "Portable Terminal, Imaging Device and Reading Device"; filed Jul. 19, 2018.
Related U.S. Appl. No. 16/039,583; First Named Inventor: Yasunori Chiba; Title: "Portable Terminal"; filed Jul. 19, 2018.
Office Action (Non-Final Rejection) dated Apr. 12, 2019 issued in U.S. Appl. No. 16/039,550.
Office Action (Non-Final Rejection) dated Mar. 20, 2019 issued in U.S. Appl. No. 16/039,583.
Office Action (Non-Final Rejection) dated Feb. 27, 2019 issued in U.S. Appl. No. 16/039,528.
Notice of Allowance dated Aug. 19, 2019 issued in U.S. Appl. No. 16/039,550.
Office Action (Final Rejection) dated Aug. 19, 2019 issued in U.S. Appl. No. 16/039,583.
Japanese Office Action dated Mar. 2, 2020 (and English translation thereof) issued in Japanese Application No. 2017-141289.
Japanese Office Action dated Nov. 13, 2019 (and English translation thereof) issued in Japanese Patent Application No. 2017-141289.
Reconsideration Report by Examiner before Appeal (and English language translation thereof) with a drafting date of Jul. 28, 2020 issued in Japanese Application No. 2017-141289.

* cited by examiner

PORTABLE TERMINAL, IMAGING DEVICE AND READING DEVICE

CROSS-REFERENCE TO RELATED APPLICATION

This application is based upon and claims the benefit of priority from the prior Japanese Patent Application No. 2017-141289, filed Jul. 20, 2017, the entire contents of which are incorporated herein by reference.

BACKGROUND OF THE INVENTION

1. Field of the Invention

The present invention relates to a handheld portable terminal, an imaging device and a reading device.

2. Description of the Related Art

For example, a handheld portable terminal is known which has a structure where the lower surface of a device case is formed to have a curved shape and a finger rest projected portion is provided on the lower surface of the device case so that the device case can be gripped by one hand with the thumb of a holding hand of a user being placed on the upper surface of the device case, the other fingers being placed on the lower surface of the device case, and the index finger being hooked on the finger rest projected portion, as described in Japanese Patent Application Laid-Open (Kokai) Publication No. 10-112891.

That is, the portable terminal of this type is structured as follows. The device case is gripped by one hand with the thumb being placed on an operation section provided on the upper surface of the device case and the other fingers being placed on the lower surface of the device case, and the index finger is hooked on the finger rest projected portion provided on the lower surface of the device case as if it is hooked on the trigger of a pistol, so that the operation section on the upper surface is operated by the thumb and a switch key provided on the finger rest projected portion on the lower surface is subjected to a key operation by the index finger.

However, in this portable terminal, the switch key may be inadvertently operated by the index finger of the user when the index finger is hooked on the finger rest projected portion, Therefore, when the user grips the device case, the index finger is required to be lightly hooked on the finger rest projected portion. Accordingly, it is inconveniently difficult to reliably grip the device case by one hand.

The present invention is to provide a portable terminal that can be gripped by one hand of a user and can prevent inadvertent switch operations on a switch section.

SUMMARY OF THE INVENTION

In accordance with one aspect of the present invention, there is provided a portable terminal comprising: a grip section provided as one end of a terminal main body and capable of being gripped by one hand of a user in a gripping style where the user places thumb of the one hand on a first surface of the terminal main body and holds a second surface positioned on a rear side of the first surface by at least an index finger and a middle finger extended from a side of the terminal main body, wherein the second surface of the grip section has a first raised portion provided such that a first vertex portion is positioned between the index finger and the middle finger in the gripping style, and a second raised portion having a second vertex portion such that the index finger is interposed between the first vertex portion and the second vertex portion in the gripping style, and wherein a switch section is provided such that a pressing target portion is exposed to a sloped surface area of the second raised portion on a side opposite to a side where the index finger is positioned in the gripping style.

In accordance with another aspect of the present invention, there is provided an imaging device comprising: a grip section provided as one end of a terminal main body and capable of being gripped by one hand of a user in a gripping style where the user places thumb of the one hand on a first surface of the terminal main body and holds a second surface positioned on a rear side of the first surface by at least an index finger and a middle finger extended from a side of the terminal main body; and an imaging section provided on the second surface of the terminal main body in a manner to be positioned closer to an other end of the terminal main body than the grip section, wherein the second surface of the grip section has a first raised portion provided such that a first vertex portion is positioned between the index finger and the middle finger in the gripping style, and a second raised portion having a second vertex portion such that the index finger is interposed between the first vertex portion and the second vertex portion in the gripping style, and wherein a switch section is provided such that a pressing target portion is exposed to a sloped surface area of the second raised portion on a side opposite to a side where the index finger is positioned in the gripping style.

In accordance with another aspect of the present invention, there is provided a reading device comprising a grip section provided as one end of a terminal main body and capable of being gripped by one hand of a user in a gripping style where the user places thumb of the one hand on a first surface of the terminal main body and holds a second surface positioned on a rear side of the first surface by at least an index finger and a middle finger extended, from a side of the terminal main body; and an optical reading section provided on the second surface of the terminal main body in a manner to be positioned closer to an other end of the terminal main body than the grip section, wherein the second surface of the grip section has a first raised portion provided such that a first vertex portion is positioned between the index finger and the middle finger in the gripping style, and a second raised portion having a second vertex portion such that the index finger is interposed between the first vertex portion and the second vertex portion, and wherein a switch section is provided such that a pressing target portion is exposed to a sloped surface area of the second raised portion on a side opposite to a side where the index finger is positioned in the gripping style.

The present invention enables a user to grip a device case by one hand and prevents inadvertent switch operations on a switch section.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment of a portable terminal to which the present invention has been applied will hereinafter be described with reference to FIG. 1 to FIG. 7.

This portable terminal includes a device case 1 as a terminal main body, as shown in FIG. 1 to FIG. 5. This device case 1 is formed to have a substantially rectangular shape elongated in a longitudinal direction (portrait orientation in FIG. 1).

This device case 1 is formed to have its substantially half on an upper side as a broad portion 1a, have the remaining half on a lower side as a narrow portion 1b, and have a substantially Japanese battledore shape as a whole, as shown in FIG. 1 to FIG. 5. That is, the broad portion 1a on the upper side is formed so as to have a length (width) in a lateral direction (landscape orientation in FIG. 1) orthogonal to its longitudinal direction longer (wider) than the length (width) of the narrow section 1b on the lower side in the lateral direction (landscape orientation in FIG. 1).

Figure 1:
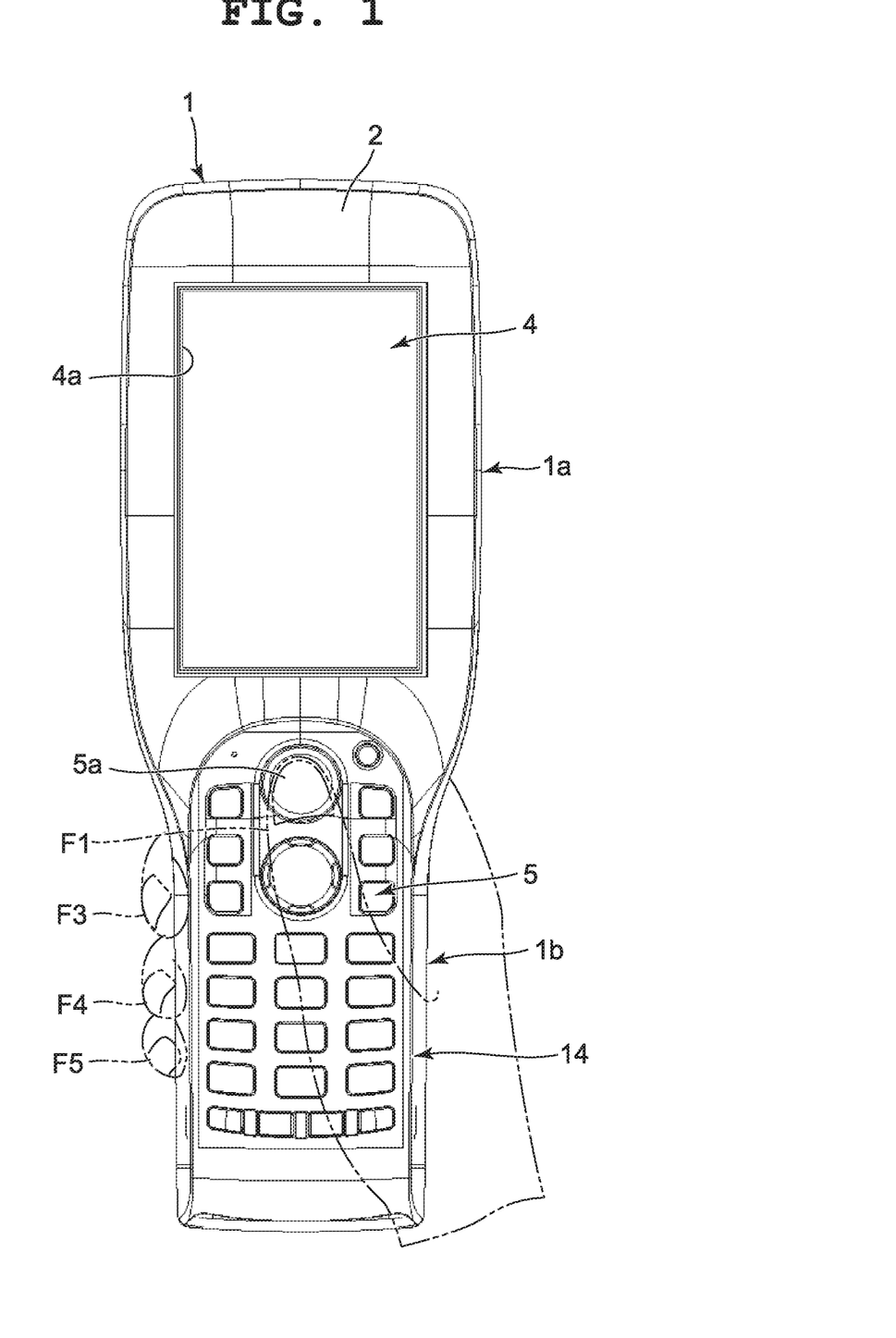
FIG. 1 is a front view of an embodiment in which the present invention has been applied to a portable terminal.
Figure 2:
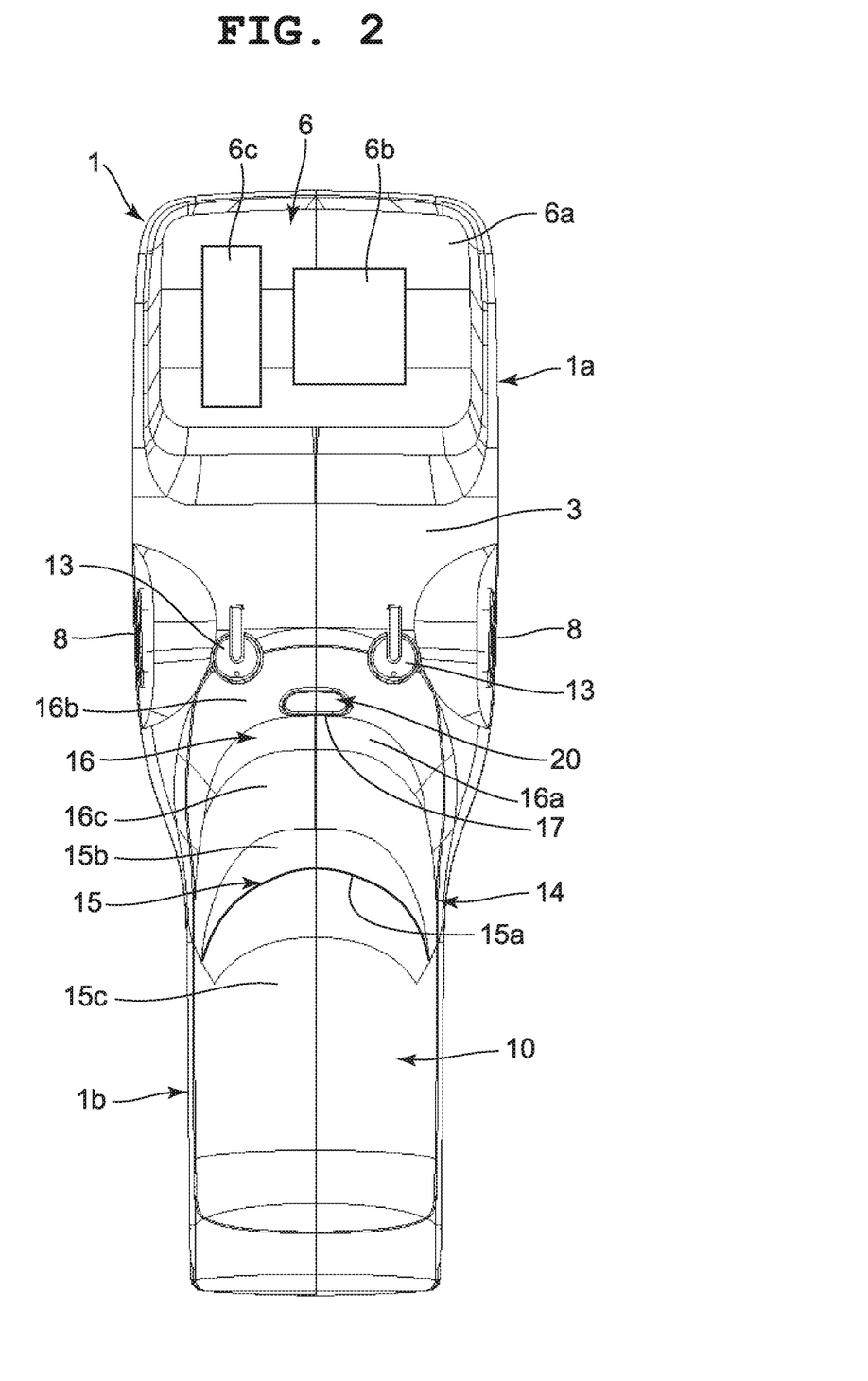
FIG. 2 is a rear view of the portable terminal shown in FIG. 1.
Figure 3:
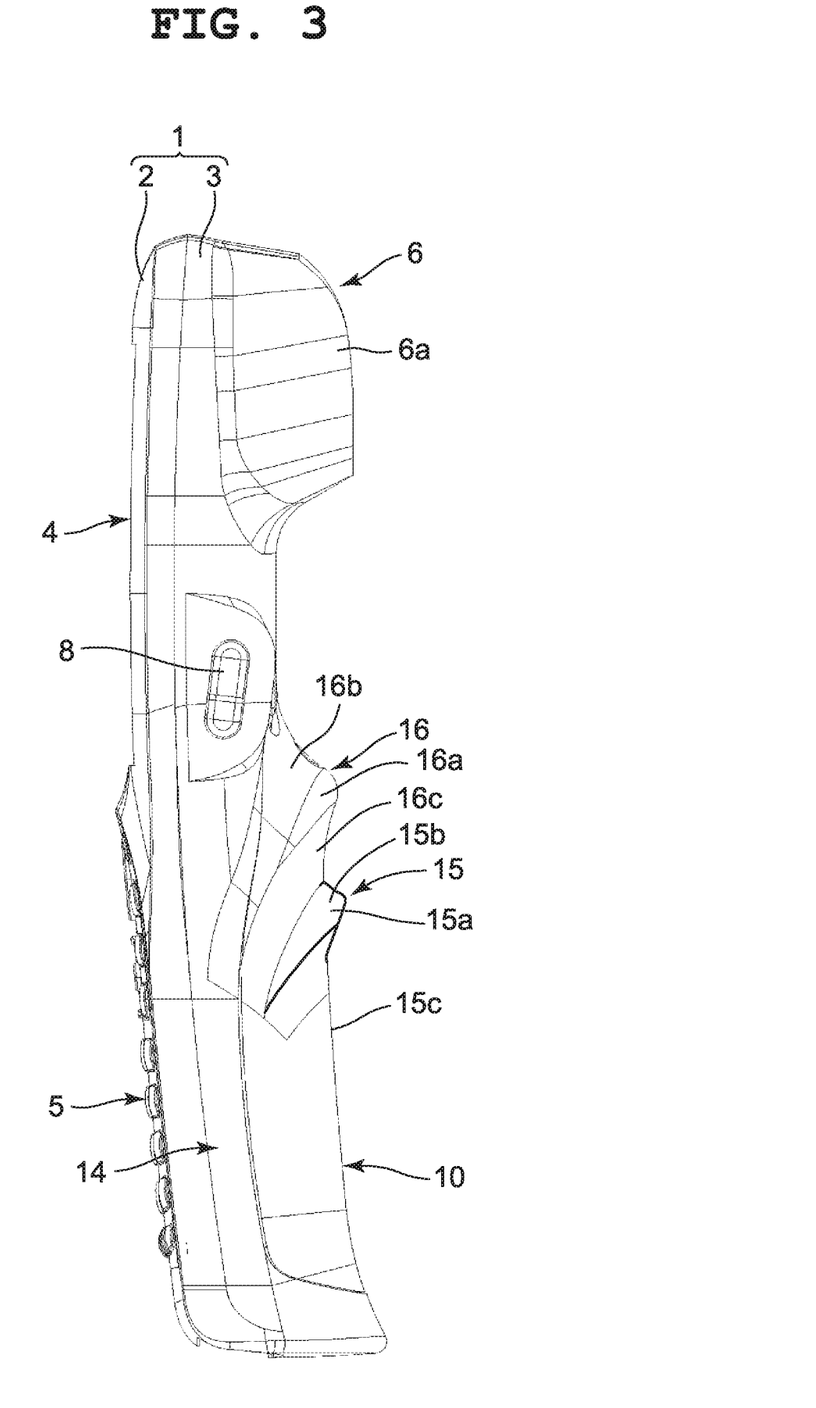
FIG. 3 is a left side view of the portable terminal shown in FIG. 2.

Also, this device case 1 is structured to have an upper case 2 and a lower case 3 and have modules (not shown) incorporated therein, as shown in FIG. 1 to FIG. 5. The upper case 2 is structured to be formed, as with the device case 1, in a substantially Japanese battledore shape having a broad portion on the upper side and a narrow portion on the lower side and have a side surface portion of its outer edge attached to the lower case 3, as shown in FIG. 1 and FIG. 3.

Figure 5:
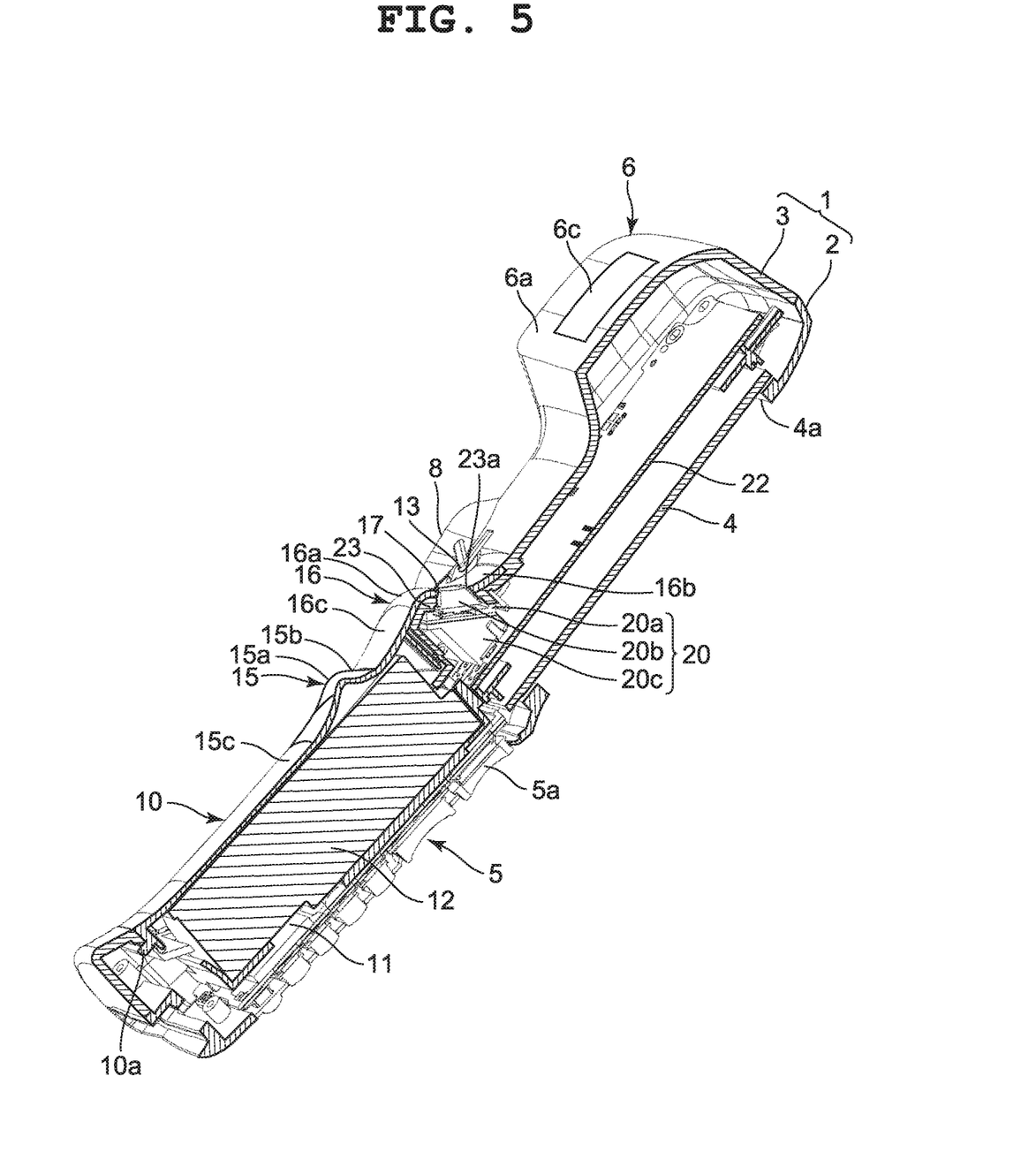
FIG. 5 is a perspective view showing a cross section of the portable terminal taken along line A-A in FIG. 4.

Also, on the broad portion on the upper side on the front surface that is the upper surface of the upper case 2, a display section 4 is provided over a substantially entire area, as shown in FIG. 1 and FIG. 5. Also, on the narrow portion on the lower side on the front surface of the upper case 2, a key operation section 5 is provided over a substantially entire area. The display section 4 is a display panel of a flat-surface type, such as a liquid-crystal display panel or EL (electroluminescence) display panel, and is formed to have a substantially rectangular shape.

This display section 4 is structured to be arranged in the upper case 2 so as to correspond to a display window section 4a provided on the front surface of the upper case 2, whereby information displayed on the display section 4 can be viewed from above the upper case 2 through the display window section 4a, as shown in FIG. 1 and FIG. 5. The key operation section 5 includes various keys required for the portable terminal, such as numeric keys, a cursor key, and function keys. In the present embodiment, the key operation section 5 has an upper surface trigger key 5a arranged on its upper middle area.

Figure 4:
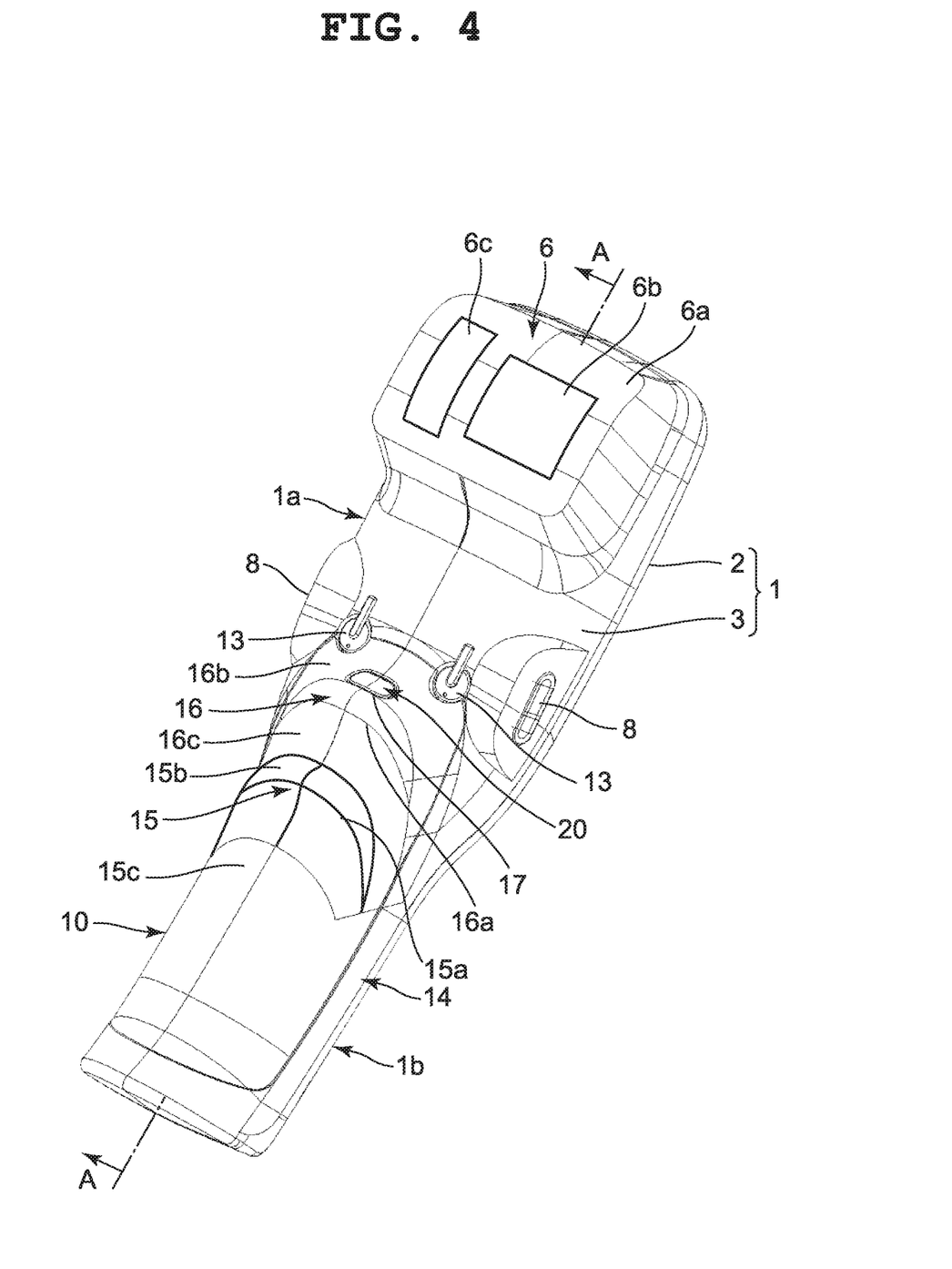
FIG. 4 is a rear perspective view of the portable terminal shown in FIG. 1.

The lower case 3 is structured to be formed, as with the upper case 2, in a substantially Japanese battledore shape having a broad portion on the upper side and a narrow portion on the lower side and have a side surface portion of its outer edge attached to the upper case 2, as shown in FIG. 2 to FIG. 4. An optical reading section 6 is provided on the rear surface as the lower surface of the broad portion positioned on the upper side of this lower case 3.

This optical reading section 6 includes a laser reading section and an imaging section (both are not shown), and these sections are stored in a read projection section 6a provided projecting in a box shape to the rear surface positioned on the upper side in the broad portion of the lower case 3, as shown in FIG. 2 to FIG. 5. In the present embodiment the read projection section 6a is provided with a first window section 6b corresponding to the laser reading section and a second window section 6c corresponding to the imaging section.

The optical reading section 6 is structured such that the laser reading section emits a laser beam from the first window section 6b of the read projection section 6a to the outside of the device case 1 and receives a reflected light of the laser beam so as to read, for example, a barcode of an article, as shown in FIG. 2 to FIG. 5. Also, this optical reading section 6 is structured such that the imaging section captures through the second window section 6c, an image of an article from which its barcode is to be read by the laser reading section.

Also, to substantially the midpoint of the device case 1 in the longitudinal direction (length direction), that is, on both sides of the broad portion 1a positioned on a boundary side between the broad portion 1a and the narrow portion 1b, side trigger keys 8 are provided, as shown in FIG. 1 to FIG. 5. These side trigger keys 8 and the upper surface trigger key 5a of the key operation section 5 are to cause a reading operation by the optical reading section 6 to be performed.

Furthermore, on the narrow portion 1b positioned on the lower side of this device case 1, a battery accommodating section 11 to be covered by a battery cover 10 is provided so as to correspond to the key operation section 5, as shown in FIG. 2 to FIG. 5. This battery accommodating section 11 is to accommodate a rechargeable battery 12, is provided inside the narrow portion 1b of the device case 1 so as to correspond to the key operation section 5 provided on the narrow portion 1b of the device case 1, and is open to the back surface side.

Also, on the rear surface of the lower case 3 positioned between the battery accommodating section 11 and the optical reading section 6, a pair of attachment levers 13 is provided to removably attach the battery cover 10 which openably covers the battery accommodating section 11 to the lower case 3, as shown in FIG. 2 and FIG. 4. That is, the pair of attachment levers 13 is provided near the side trigger keys 8 provided on both sides of the device case 1. The pair of these attachment levers 13 is structured to be rotated to removably engage the edge on the upper side of the battery cover 10 with the rear surface of the lower case 3.

As a result, the battery cover 10 is structured to be attached to the rear surface of the lower case 3 by the edge on the upper side being engaged with the lower case 3 by the pair of the attachment levers 13, with it openably covering the battery accommodating section 11, as shown in FIG. 2, FIG. 4 and FIG. 5. Also, a fulcrum projection portion 10a is provided at the end on the lower side of the battery cover 10, The battery cover 10 is structured to open and close the battery accommodating section 11 by rotating the fulcrum projection portion 10a as a fulcrum.

On the narrow portion 1b positioned on the lower side of the device case 1, a grip section 14 is provided so as to be gripped by one hand of the user, across the front surface of the device case 1 serving as a first surface and the rear surface positioned opposite thereto and serving as a second surface, as shown in FIG. 1 to FIG. 4. This grip section 14 is structured to be gripped by one hand of the user in a gripping style where the thumb F1 of one hand of the user is placed on the front surface of the device case 1 and the rear surface of the device case 1 is held by other fingers F2 to F5 extended from the side of the device case 1.

That is, this grip section 14 is constituted by the narrow portion 1b of the device case 1 including the narrow portion of the upper case 2 and the narrow portion of the lower case 3, and the battery cover 10 of the lower case 3, as shown in FIG. 1 to FIG. 4. In the present embodiment, each of sides of the narrow portion of the upper case 2 and the narrow portion of the lower case 3 in the grip section 14 is formed in an arc-shaped curved surface which makes the hand of the user gripping the grip section 14 in the above-described gripping style naturally curved. Also, the battery cover 10 of the lower case 3 is formed in a curved shape projecting so as to be mildly curved from both sides of the lower case 3 toward the rear surface side.

As a result, the grip section 14 has a shape by which the other fingers F2 to F5 are naturally flexed and placed around the rear surface of the device case 1, in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 1 to FIG. 4.

That is, the grip section 14 is formed in a shape that can be easily gripped by one hand irrespective of the size of the hand of the user, by the gripping hand of the user fitting thereto when the user holds the device case 1 by one hand in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, as shown in FIG. 1 to FIG. 4.

Also, in this grip section 14, the battery cover 10 positioned on the rear surface is provided with a first raised portion 15 and a second raised portion 16 as shown in FIG. 2 to FIG. 7. The first raised portion 15 is positioned between the index finger F2 and the middle finger F3 of the gripping hand of the user when the user grips the grip section 14 by one hand in the gripping style where the user places the thumb F1 on the front surface of the device case 1 and holds the rear surface of the device case 1 by the other fingers F2 to F5 extended from the side of the device case 1. Between the first raised portion 15 and the second raised portion 16, the index finger F2 of the gripping hand of the user in the above-described gripping style is interposed.

Figure 6:
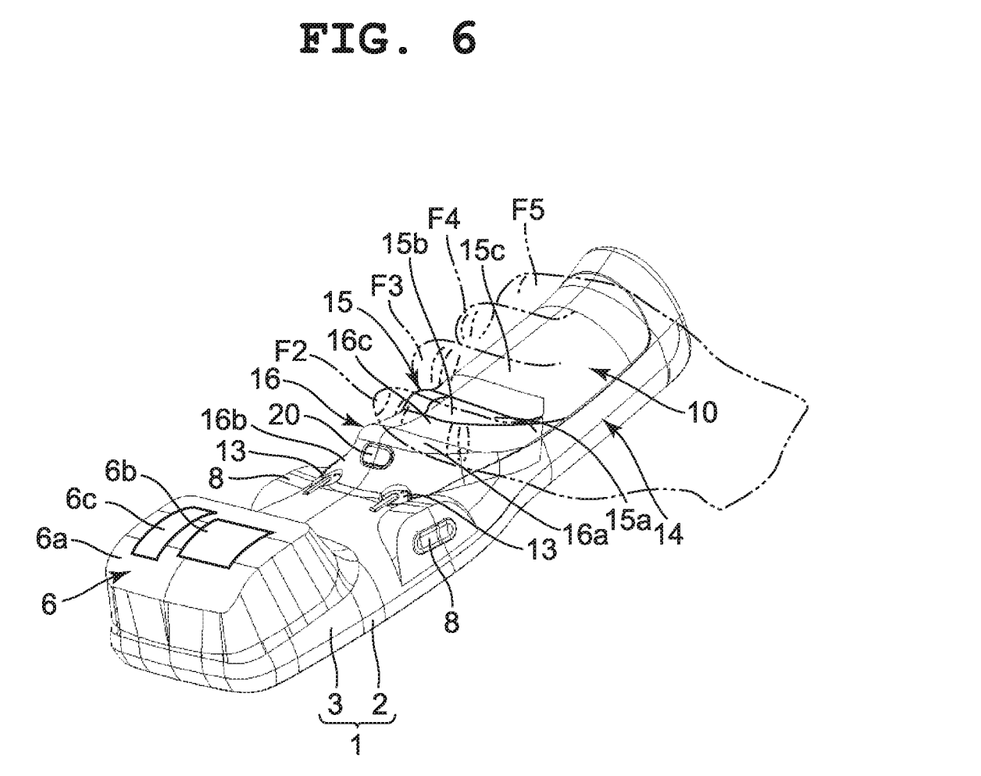
FIG. 6 is a perspective view in which a grip section of the portable terminal shown in FIG. 4 has been gripped in a first gripping style.
Figure 7:
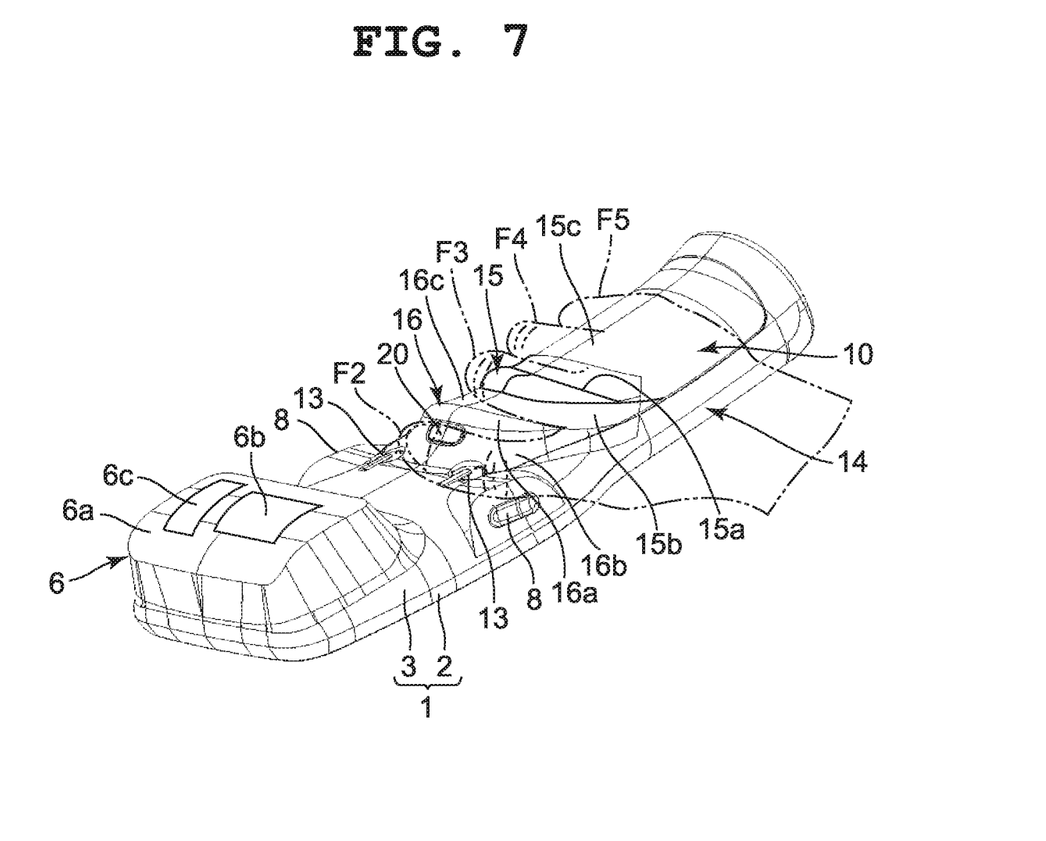
FIG. 7 is a perspective view in which the grip section of the portable terminal shown in FIG. 4 has been gripped in a second gripping style.

As a result, the grip section 14 is structured to be gripped in a first way of gripping (refer to FIG. 6) which is a standard way of gripping and in which a first vertex portion 15a of the first raised portion 15 is arranged between the index finger F2 and the middle finger F3 of the gripping hand of the user and a second way of gripping which is used for a switch operation (refer to FIG. 7) and in which a second vertex portion 16a of the second raised portion 16 is arranged between the index finger F2 and the middle finger F3 of the gripping hand of the user, when the user grips the grip section 14 by one hand in the above-described gripping style, as shown in FIG. 6 and FIG. 7.

That is, in the first way of gripping, when the user grips the grip section 14 by one hand in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, the index finger F2 of the hand of the user gripping the grip section 14 is interposed between the first vertex portion 15a of the first raised portion 15 and the second vertex portion 16a of the second raised portion 16 and the first vertex portion 15a of the first raised portion 15 is arranged between the index finger F2 and the middle finger F3, as shown in FIG. 6.

Also, in the second way of gripping, when the user grips the grip section 14 by one hand in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, the middle finger F3 of the hand of the user gripping the grip section 14 is interposed between the first vertex portion 15a of the first raised portion 15 and the second vertex portion 16a of the second raised portion 16 and the second vertex portion 16a of the second raised portion 16 is arranged between the index finger F2 and the middle finger F3, as shown in FIG. 7.

In the present embodiment, the second raised portion has the V-shaped second vertex portion 16a which is positioned between the index finger F2 and the middle finger F3 of the hand of the user gripping the grip section 14 when the user grips the grip section 14 by one hand in the above-described second way of gripping for a switch operation, as shown in FIG. 2 to FIG. 5. This second vertex portion 16a is formed to be positioned between the index finger F2 and the middle finger F3 of the hand of the user gripping the grip section 14 and be continuous in a curved shape along a bent shape of the index finger F2 and the middle finger F3.

That is, this second vertex portion 16a is formed to be continuous in a curved shape along the bent shape of the index finger F2 and the middle finger F3 In the lateral direction orthogonal to the length direction of the device case 1 so that a continuous middle portion in the lateral direction projects most toward the rear surface side of the device case 1 and the projection length gradually decreases from the middle portion in the lateral direction toward the both sides in the lateral direction, as shown in FIG. 2 to FIG. 7. Also, with the second vertex portion 16a as a boundary, this second raised portion 16 includes a second finger rest area 16b as one tail and a second finger placement area 16c as the other tail.

The second finger rest area 16b is a sloped surface on which the index finger F2 is firmly placed when the user grips the grip section 14 in the above-described second way of gripping, and is formed as a steep sloped surface from the upper side of the battery cover 10 toward the second vertex portion 16a, as shown in FIG. 2 to FIG. 7. The second finger placement area 16c is a sloped surface on which the middle finger F3 is firmly placed when the user grips the grip section 14 in the above-described second way of gripping, and is formed as a sloped surface mildly sloped from the second vertex portion 16a toward a lower portion of the first raised portion 15.

That is, the second finger rest area 16b is formed as a sloped surface on which the pulp of the index finger F2 of the hand of the user gripping the grip section 14 is firmly placed toward the lower side of the battery cover 10 in the longitudinal direction (length direction), that is, the hand of the user gripping the grip section 14 in the second way of gripping where the user places the thumb F1 on the key operation section 5 so as to operate the key operation section 5 by the thumb F1 and holds the rear surface of the device case 1 by the other fingers F2 to F5 extended from the side of the device case 1, as shown in FIG. 2 to FIG. 7.

This second finger rest area 16b is formed as a sloped surface rising from an upper portion on the upper side of the battery cover 10 toward the second vertex portion 16a at a steep angle, as shown in FIG. 2 to FIG. 7. Also, this second finger rest area 16b is formed to be curved in an arc shape corresponding to the bent state of the index finger F2 along the second vertex portion 16a that is continuous in the lateral direction orthogonal to the longitudinal direction (length direction) of the device case 1.

Accordingly, the second raised portion 16 is structured such that the pulp of the index finger F2 of the user is firmly placed on the second finger rest area 16b with the index finger F2 being bent along the curve of the second finger rest area 16b and, in this state, the second finger rest area 16b is pulled toward the lower side of the device case 1 in the longitudinal direction, that is, toward the hand of the user gripping the grip section 14, when the user grips the grip section 14 in the second way gripping for a switch operation, as shown in FIG. 2 to FIG. 7.

Also, the second finger placement area 16c is formed having a curved surface by which, when the user grips the grip section 14 in the second ray of gripping for a switch operation, the side of the middle finger F3 of the hand of the user gripping the grip section 14 is placed thereon and the pulp of the middle finger F3 is naturally flexed with it being firmly placed on a first finger rest area 15b of the first raised portion 15 described further below, as shown in FIG. 2 to FIG. 7.

That is, this second finger placement area 16c is formed having a curved surface mildly sloped from the second vertex portion 16e toward the lower side of the battery cover 10, as shown in FIG. 2 to FIG. 7. As a result, this second finger placement area 16c is formed in a mildly curved shape forming a convex toward the rear surface of the battery cover 10 so that the middle finger F3 is naturally flexed when the user grips the grip section 14 in the second way of gripping.

On the other hand, the first raised portion 15 has the V-shaped first vertex portion 15a positioned between the index finger F2 and the middle finger F3 of the hand of the user gripping the grip section 14 when the user grips the grip section 14 by one hand in the above-described first way of gripping which is a standard way of gripping, as shown in FIG. 2 to FIG. 7. This first vertex portion 15a formed to be positioned between the index finger F2 and the middle finger F3 of the hand of the user gripping the grip section 14 and be continuous in a curved shape along the bent shape of the index finger F2 and the middle finger F3.

That is, this first vertex portion 15a is formed to be continuous in a curved shape along the bent shape of the index finger F2 and the middle finger F3 in the lateral direction orthogonal to the length direction of the device case 1 such that a continuous middle portion in the lateral direction projects most toward the rear surface side of the device case 1 and the projection length gradually decreases from the middle portion in the lateral direction toward the both sides in the lateral direction, as shown in FIG. 2 to FIG. 7. Also, with the first vertex portion 15a as a boundary, this first raised portion 15 includes the first finger rest area 15b as one tail and a first finger placement area 15c as the other tail.

The first finger rest area 15b is a sloped surface on which the index finger F2 is firmly placed when the user grips the grip section 14 in the above-described first way of gripping, and is formed as a steep sloped surface from the lower side of the second finger placement area 16c of the second raised portion 16 toward the first vertex portion 15a, as shown in FIG. 2 to FIG. 7. The first finger placement area 15c is a sloped surface on which the other fingers F3 to F5 are firmly placed when the user grips the grip section 14 in the above-described first way of gripping, and is formed as a sloped surface mildly sloped from the first vertex portion 15a toward the lower side of the battery cover 10.

That is, the first finger rest area 15b is formed as a sloped surface on which the pulp of the index finger F2 of the hand of the user gripping the grip section 14 is firmly placed toward the lower side of the battery cover 10 in the longitudinal direction (length direction), that is, the hand of the user gripping the grip section 14 when the user grips the grip section 14 in the first way gripping, as shown in FIG. 2 to FIG. 7.

This first finger rest area 15b is formed as a sloped surface rising from the lower side of the second finger rest area 16b of the second raised portion 16 positioned on the upper side of the battery cover 10 toward the first vertex portion 15a at a steep angle, as shown in FIG. 2 to FIG. 7. Also, this first finger rest area 15b is formed to be curved in an arc shape corresponding to the bent state of the index finger F2 along the first vertex portion 15a contiguous in the lateral direction orthogonal to the longitudinal direction (length direction) of the device case 1.

Accordingly, this first raised portion 15 is structured such that the pulp of the index finger F2 of the user is firmly placed on the first finger rest area 15b with the index finger F2 being bent along the curve of the first finger rest area 15b and, in this state, the first finger rest area 15b is pulled toward the lower side of the device case 1 in the longitudinal direction, that is, toward the hand of the user gripping the grip section 14, when the user grips the grip section 14 in the standard first way gripping, as shown in FIG. 2 to FIG. 7.

Also, the first finger placement area 15c is formed having a curved surface by which, when the user grips the grip section 14 in the first way of gripping that is a standard way of gripping, the pulp of each of the other fingers F3 to F5 of the gripping hand of the user presses the battery cover 10 of the grip section 14 toward the device case 1, whereby the middle finger F3 to the small finger F5 of the user are naturally flexed with them being aligned, as shown in FIG. 2 to FIG. 7.

That is, this first finger placement area 15c is formed having a curved surface mildly sloped from the first vertex portion 15a toward the lower side of the battery cover 10, as shown in FIG. 2 to FIG. 7. As a result, this first finger placement area 15c is formed in a mildly curved shape forming a convex toward the rear surface side of the battery cover 10 so that the fingers F3 to F5 other than the index finger F2 are naturally flexed when the user grips the grip section 14 in the first way of gripping.

Furthermore, this device case 1 is formed such that the grip section 14 has a bilaterally symmetrical shape with respect to the center position of the device case 1 in the lateral direction, as shown in FIG. 1 to FIG. 7. As a result, this device case 1 is structured such that the user can grip the grip section 14 by the right hand or the left hand in a similar manner.

The second finger rest area 16b of the second raised portion 16 provided on the upper side of the battery cover 10 is structured to be held by the rear surface of a cover holding section 23 provided to the lower case 3, as shown in FIG. 5, That is, this cover holding section 23 is raised and formed in a shape substantially similar to that of the second finger rest area 16b Inside this cover holding section 23, a lower surface trigger key 20 is provided corresponding to the second finger rest area 16b.

As with the upper surface trigger key 5a of the key operation section 5 and the side trigger keys 8, this lower surface trigger key 20 is to cause a reading operation by the optical reading section 6 to be performed, as shown in FIG. 5. This lower surface trigger key 20 includes a switch main body 20a, an operation button 20b, and a switch holding section 20c.

That is, the switch holding section 20c of this lower surface trigger key 20 is attached to the inner surface of the cover holding section 23 with it being arranged in the cover holding section 23 corresponding to the second raised portion 16, as shown in FIG. 5. The switch main body 20a is structured to be held in the switch holding section 20c with it being sloped in parallel to the sloped surface of the second finger rest area 16b of the second raised portion 16 and, in this state, be electrically connected to a circuit board 22 provided in the broad portion 1a of the device case 1.

The operation button 20b, which is a pressing target portion, is arranged in the switch main body 20a with it being sloped in parallel to the sloped surface of the second finger rest area 16b, and arranged in a button insertion hole 17 provided in the second finger rest area 16b of the battery cover 10 through a button hole 23a provided in the cover holding section 23. As a result, the operation button 20b is structured to cause the switch main body 20a to perform an ON operation when it is pressed from outside the device case 1. In the present embodiment the operation button 20b is arranged to be recessed in the button insertion hole 17 of the second finger rest area. 16b.

Accordingly, the lower surface trigger key 20 is structured such that the operation button 20b is not pressed by the pulp of the index finger F2 and the switch main body 20a does not an perform ON operation even if the pulp of the index finger F2 of the hand of the user gripping the grip section 14 is pressed onto the second finger rest area 16b of the second raised portion 16 along its curve with the index finger F2 being in a bent shape and, in this state, the second raised portion 16 is pulled toward the lower side of the device case 1, that is, toward the hand of the user gripping the grip section 14, when the user grips the grip section 14 in the second way of gripping for a switch operation, as shown in FIG. 7.

Also, the lower surface trigger key 20 is structured such that, in the state in which the user grips the grip section 14 in the first way of gripping and firmly places the pulp of the index finger F2 of the hand gripping the grip section 14 along the curve of the second finger rest area 16b, when the pulp of the index finger F2 pulls the second raised portion 16 toward the lower side of the device case 1, that is, toward the hand of the user gripping the grip section 14, and is strongly pushed into the button insertion hole 17, the operation button 20b is pushed by the pulp of the index finger F2 to cause the switch main body 20a to perform an ON operation, as shown in FIG. 7.

Next, the mechanism of this portable terminal is described.

To use this portable terminal, the user first attaches the battery cover 10 to the rear surface of the device case 1 so as to cover the battery accommodating section 11 provided to the narrow portion 1b of the device case 1. Here, the end portion of the battery cover 10 on the lower side is attached to the inner edge portion of the battery accommodating section 11 on the lower side and, with the fulcrum projection portion 10a at the end of this attached battery cover 10 as a fulcrum, the battery cover 10 is rotated to cause the upper side of the battery cover 10 to be placed on the cover holding section 23 of the lower case 3.

As a result, since the button insertion hole 17 provided in the second finger rest area 16b in the second raised portion 16 of the battery cover 10 corresponds to the button hole 23a of the cover holding section 23, the above-described operation causes the operation button 20b of the lower surface trigger key 20 to be inserted through this button hole 23a into the button insertion hole 17 provided in the second finger rest area 16b of the battery cover 10. Here, the operation button 20b is arranged inside the button insertion hole 17 of the second finger rest area 16b without projecting outside the device case 1.

Also, here, the edge of the upper side of the battery cover 10 corresponds to the pair of attachment levers 13 provided on the rear surface of the lower case 3. Accordingly, by the user rotating the pair of these attachment levers 13, the edge of the upper side of the battery cover 10 is pressed onto and engaged with the rear surface of the lower case 3 by the pair of attachment levers 13. As a result, the battery cover 10 covers the battery accommodating section 11 and is attached to the rear surface of the lower case 3 across the lower surface trigger key 20.

To grip this portable terminal in the first way of gripping which is a standard way of gripping, the user holds the device case 1 by gripping the grip section 14 at the position of the battery cover 10 by one hand, as shown in FIG. 6. That is, the user grips the grip section 14 by one hand such that the first vertex portion 15a of the first raised portion 15 is arranged between the index finger F2 and the middle finger F3, in the gripping style where the user places the thumb F1 on the key operation section 5 so as to operate the key operation section 5 by the thumb F1 and holds the rear surface of the device case 1 by the other fingers F2 to F5 extended from the side of the device case 1.

Here, the thumb F1 is placed above the key operation section 5 on the front surface of the device case 1, and the first vertex portion 15a of the first raised portion 15 of the battery cover 10 on the rear surface side of the device case 1 is arranged between the index finger F2 and the middle finger F3 of the hand of the user gripping the grip section 14. In this state, the pulp of the index finger F2 is firmly placed on the first finger rest area 15b of the first raised portion 15, and the pulp of each of the other fingers F3 to F5 is placed on the first finger placement area 15c of the first raised portion 15.

In this state, when the pulp of the index finger F2 of the hand of the user gripping the grip section 14 is firmly placed on the sloped surface of the first finger rest area 15b in the first raised portion 15 and the first finger rest area 15b is pulled toward the lower side of the raised portion 15, that is, toward the hand of the user gripping the grip section 14, the index finger F2 is firmly placed on the first finger rest area 15b with it being naturally flexed along the curve.

Also, here, the pulp of each of the other fingers F3 to F5 of the hand of the user gripping the grip section 14 is placed and aligned on the first finger placement area 150 of the first raised portion 15, and the pulp of each of these fingers F3 to F5 presses the first finger placement area 15c toward the device case 1. In this state, the fingers F3 to F5 are placed with them being aligned and naturally flexed along the curved surface of the first finger placement area. 15c.

As a result, the middle finger F3 to the small finger F5 of the hand of the user gripping the grip section 14 are placed and aligned on the first finger placement area 15c with them being naturally flexed to wrap the first finger placement area 15c of the first raised portion 15. As a result, the fingers F3 to F5 are favorably and stably placed along the curved surface of the first finger placement area 15c. This allows the user to reliably and favorably grip the grip section 14 of the device case 1 by one hand.

As described above, the grip section 14 is provided to the narrow portion 1b of the device case 1, and has a curved shape projecting to be mildly curved from both sides toward the rear surface of the grip section 14. As a result, when the user grips the grip section 14 of the device case 1 in the first way of gripping which is a standard way of gripping, the user can reliably and favorably grip the grip section 14 of the device case 1 by the hand gripping the grip section 14. Also, the user can fit the hand gripping the grip section 14 to the grip section 14.

Also, the grip section 14 is formed in a bilaterally symmetrical shape with respect to the center position of the device case 1 in the lateral direction. Therefore, when the user grips the grip section 14 of the device case 1 in the first way of gripping which is a standard way of gripping, the grip section 14 of the device case 1 can be reliably and favorably gripped by the right hand or the left hand of the user. Here, by the lower surface of the grip section 14 being formed in a curved shape mildly curved to project, the gripping hand of the user fits the grip section 14 when the user grips the grip section 14 of the device case 1 by one hand.

When the user grips the grip section 14 of the device case 1 in the first way of gripping which is a standard way of gripping as described above, the thumb F1 is placed above the key operation section 5 without obstructing the display section 4, so that the user can favorably perform key operations on the key operation section 5 by freely moving the thumb F1 above the key operation section 5 while viewing information displayed on the display section 4.

Also, when the user grips the grip section 14 of the device case 1 in the first way of gripping which is a standard way of gripping, the index finger F2 of the gripping hand of the user is placed on the first finger rest area 15b of the first raised portion 15. Therefore, the user does not erroneously operate the lower surface trigger key 20 provided corresponding to the second finger rest area 16b of the second raised portion 16.

On the other hand, in the case of the second way of gripping the portable terminal for a switch operation, in the gripping style where the user places the thumb F1 on the key operation section 5 so as to operate the key operation section 5 by the thumb F1 and holds the rear surface of the device case 1 by the other fingers F2 to F5 extended from the side of the device case 1, the second vertex portion 16a of the second raised portion 16 is arranged between the index finger F2 and the middle finger F3 of the hand of the user gripping the grip section 14, and the grip section can be gripped by one hand, as shown in FIG. 7.

Here, the index finger F1 is placed above the key operation section 5 on the front surface of the device case 1, and the second vertex portion 16a of the second raised portion 16 is arranged between the index finger F2 and the middle finger F3 of the hand of the user gripping the grip section 14. In this state, the pulp of the index finger F2 is firmly placed on the second finger rest area 16b of the second raised portion 16, and the middle finger F3 is placed in the second finger placement area 16c and interposed between the second vertex portion 16a of the second raised portion 16 and the first vertex portion 15a of the first raised portion 15.

That is, when the pulp of the index finger F2 of the user is firmly placed on the second finger rest area 16b of the second raised portion 16, the pulp of the middle finger F3 is firmly placed on the first finger rest area 15b of the first raised portion 15 with it being placed in the second-mounting area 16c, and the pulps of the other ring finger F4 and small finger F5 are arranged and aligned on the second finger placement area 16c of the first raised portion 15.

In this state, in the gripping style where the user places the thumb F1 on the device case 1 so as to operate the key operation section 5 by the thumb F1 and holds the rear surface of the device case 1 by the other fingers F2 to F5 extended from the side of the device case 1, the user firmly places the pulp of the index finger F2 of the hand gripping the grip section 14 on the sloped surface of the second finger rest area 16b, and also firmly places the pulp of the middle finger F3 on the first finger rest area 15b of the first raised portion 15.

Then, the second finger rest area 16b is pulled by the index finger F2 of the hand of the user gripping the grip section 14 toward the lower side of the device case 1, that is, toward the hand of the user gripping the grip section 14, and the first finger rest area 15b of the first raised portion 15 is pulled by the middle finger F3 of the gripping hand of the user toward the lower side of the device case 1, that is, toward the hand of the user gripping the grip section 14.

As a result, the index finger F2 is naturally flexed along the curve of the second finger rest area 16b and firmly placed thereon, whereby the device case 1 is pulled by the index finger F2 toward the gripping hand of the user positioned on the lower side. Also, here, the middle finger F3 is naturally flexed along the curve of the first finger rest area 15 and firmly placed thereon, whereby the device case 1 is pulled by the middle finger F3 toward the gripping hand of the user positioned on the lower side.

Here, even when the index finger F2 of the hand of the user gripping the grip section 14 is firmly placed on the first finger rest area 15b along its curve with it being in a bent shape, the pulp of the index finger F2 is not deeply pressed into the button insertion hole 17 in the second finger rest area 16b. Therefore, the operation button 20b is not pressed by the pulp of the index finger F2, and the switch main body 20a of the lower surface trigger key 20 does not perform an ON operation.

Also, here, in a state where the pulps of each the ring finger F4 and the small finger F5 of the hand of the user gripping the grip section 14 have been placed and aligned on the first finger placement area 15c of the first raised portion 15, when the ring finger F4 and the small finger F5 are pressed onto the first finger placement area 15c, the pulp of each of the ring finger F4 and the small finger F5 is favorably and stably placed and pressed along the curved surface of the first finger placement area 15c. As a result, the user can reliably and favorably grip the grip section 14 by one hand in the second way of gripping.

As described above, the grip section 14 is provided to the narrow portion 1b of the device case. This grip section 14 has a shape mildly curved from both sides of the grip section 14 toward the rear surface side to project Therefore, when the user grips the grip section 14 of the device case 1 in the second way of gripping, the user can reliably and favorably grip the grip section 14 of the device case 1 by the hand of the user gripping the grip section 14, and can fit the hand of the user gripping the grip section 14 to the grip section 14.

Also, since the grip section 14 has a bilaterally symmetrically shape with respect to the center position of the device case 1 in the lateral direction, when the user grips the grip section 14 of the device case 1 in the second way of gripping, the user can reliably and favorably grip the grip section 14 of the device case 1 by the right hand or the left hand of the user. In this case as well, by the lower surface side of the grip section 14 being formed in a curved shape mildly curved to project, the gripping hand of the user can fit to the grip section 14 when the user gripes the grip section 14 by one hand.

When the user grips the grip section 14 of the device case 1 in the second way of gripping as described above, the thumb F1 is placed above the key operation section 5 without obstructing the display section 4. Therefore, the user can freely move the thumb F1 above the key operation section 5 so as to favorably perform key operations on the key operation section 5.

Also, when the user grips the grip section 14 of the device case 1 in the second way of gripping as described above, the pulp of the index finger F2 is placed on the sloped surface of the second finger rest area 16b of the second raised portion 16. Therefore, the operation button 20b of the lower surface trigger key 20 inserted in the button insertion hole 17 provided in the sloped surface of this second finger rest area 16b can be easily operated by the index finger F2.

That is, when the user grips the grip section 14 of the device case 1 in the second way of gripping, the pulp of the index finger F2 of the hand of the user gripping the grip section 14 is firmly placed on the second finger rest area 16b along its curve, and the second finger rest area 16b is pulled toward the lower side of the device case 1, that is, toward the hand of the user gripping the grip section 14. In this state, when the pulp of the index finger F2 is strongly pushed into the button insertion hole 17, the operation button 20b of the lower surface trigger key 20 is pushed by the pulp of the index finger F2 to cause the switch main body 20 of the lower surface trigger key 20 to perform an ON operation.

When the lower surface trigger key 20 performs an ON operation as described above, the optical reading section 6 provided on the rear surface of the broad portion 1a of the device case 1 is driven to cause the laser reading section to emit a laser beam from the first window section 6b of the read projecting portion 6a to the outside of the device case 1, and receives a reflected light of the laser beam so as to read, for example, a barcode of an article. Also, here, through the second window section 6c, the imaging section of the optical reading section 6 captures an image of, for example, an article from which its barcode is to be read.

As described above, this portable terminal includes the grip section 14 provided at one end of the device case 1 as a terminal main body and capable of being gripped in the gripping style where the user places the thumb F1 of one hand on the front surface of the device case 1 and holds the rear surface of the device case 1 by at least the index finger F2 and the middle finger F3 extended from the side of the device case 1. Therefore, the user can grip the grip section 14 by one hand.

That is, this portable terminal has a shape by which the other fingers F2 to F5 of the user are naturally flexed and placed around the rear surface of the device case 1. Therefore, when the user holds the device case 1 by one hand in the gripping style where the user places the thumb F1 on the front surface of the device case 1 so as to operate the key operation section 5 by the thumb F1 and holds the rear surface of the device case 1 by the other fingers F2 to F5 extended from the side of the device case 1, the hand of the user gripping the grip section 14 can be naturally placed around the grip section 14. As a result, the user can easily grip the grip section 14, and the gripping hand of the user can fit to the grip section 14.

Also, in this portable terminal, on the rear surface of the grip section 14, the first raised portion 15 is provided such that the first vertex portion 15a is positioned between the index finger F2 and the middle finger F3 in the above-described gripping style, and the second raised portion 16 is provided having the second vertex portion 16a such that the index finger F2 is interposed between the second vertex portion 16a and the first vertex portion 15a in the above-described gripping style. Therefore, two ways of gripping can be performed, that is, the first way of gripping which is a standard way of gripping and in which the first vertex portion 15a of the first raised portion 15 is arranged between the index finger F2 and the middle finger F3 and the second way of gripping in which the second vertex portion 16a of the second raised portion 16 is arranged between the index finger F2 and the middle finger F3.

That is, in this portable terminal, the user can favorably grip the grip section 14 in the first way of gripping which is a standard way of gripping, with the first vertex portion 15a of the first raised portion 15 being arranged between the index finger F2 and the middle finger F3 of the hand of the user gripping the grip section 14 and the index finger F2 being interposed between the second vertex portion 16a of the second raised portion 16 and the first vertex portion 15a of the first raised portion 15.

Also, in this portable terminal, the user can favorably grip the grip section 14 in the second way of gripping for a switch operation, with the second vertex portion 16a of the second raised portion 16 being arranged between the index finger F2 and the middle finger F3 of the hand of the user gripping the grip section 14 and the middle finger F3 being interposed between the second vertex portion 16a of the second raised portion 16 and the first vertex portion 15a of the first raised portion 15.

Furthermore, in this portable terminal, the lower surface trigger key 20 is provided such that the operation button 20b as a pressing target portion is exposed to the sloped surface of the second finger rest area 16b of the second raised portion 16 on the side opposite to the side where the index finger F2 is positioned in the gripping style of the first way of gripping. Therefore, when the user grips the grip section 14 in the standard first way of gripping, the lower surface trigger key 20 cannot be operated. When the user grips the grip section 14 in the second way of gripping, the lower surface trigger key 20 can be favorably operated for a switch operation.

That is, in this portable terminal, when the user grips the grip section 14 by hand in the first way of gripping which is a standard way of gripping, the index finger F2 of the gripping hand of the user is not placed corresponding to the lower surface trigger key 20. Therefore, inadvertent switch operations on the lower surface trigger key 20 can be prevented. Also, when the user grips the grip section 14 by hand in the second way of gripping, the index finger F2 of the hand of the user gripping the grip section 14 can be placed corresponding to the lower surface trigger key 20. Therefore switch operations can be easily and reliably performed on the lower surface trigger key 20 by the index finger F2 of the user.

In the present embodiment, the second raised portion 16 and the first raised portion 15 are each formed on the curved surface corresponding to the natural curve of the index finger F2 or the middle finger F3 of the hand of the user gripping the grip section 14. Therefore, in either case of the first way of gripping or the second way of gripping, when the user grips the grip section 14, the index finger F2 or the middle finger F3 of the hand of the user gripping the grip section 14 can be placed with it being favorably flexed along the curved surface of the second raised portion 16. Also, the index finger F2 of the hand of the user gripping the grip section 14 can be placed with it being favorably flexed along the curved surface of the first raised portion 15.

Also, in this portable terminal, the lower surface trigger key 20 is arranged corresponding to the curved surface of the second finger rest area 16b of the second raised portion 16. Therefore, by the pulp of the index finger F2 of the hand of the user gripping the grip section 14 being firmly placed on the second finger rest area 16b with the index finger F2 being placed and favorably flexed along the curved surface of the second finger rest area 16b of the second raised portion 16, the lower surface trigger key 20 can be reliably and favorably caused to perform a switch operation.

Also, in this portable terminal, the battery cover 10 is attached as apart of the grip section 14. This battery cover 10 is provided with the second raised portion 16 and the first raised portion 15. Therefore, the second raised portion 16 and the first raised portion 15 can be easily manufactured together with the battery cover 10, which leads to a simple shape of the device case 1. As a result, the device case 1 can be easily manufactured.

Also, this portable terminal is provided with the key operation section 5 as an input operation section having arrayed thereon a plurality of keys operable with the thumb F1 of the gripping hand of the user gripping the grip section 14. Therefore, in either case of the first way of gripping or the second way of gripping, when the grip section. 14 is gripped, the user can favorably perform a key operation on the key operation section 5 by the thumb F1 of the gripping hand while gripping the grip section 14, which allows information to be favorably inputted.

Also, this portable terminal is provided with the display section 4 which displays information on the front surface of the device case 1 positioned in an extended area of the grip section 14. Therefore, in either case of the first way of gripping or the second way of gripping, when the user grips the grip section 14, the thumb F1 is placed above the key operation section 5 without obstructing the display section 4. Therefore, the user can favorably view the information displayed on the display section 4, and can favorably perform key operations on the key operation section 5 by freely moving the thumb F1 above the key operation section 5.

Furthermore, according to this portable terminal, the optical reading section 6 which optically reads information is provided on the rear surface of the device case 1 positioned in the extended area of the grip section 14. Therefore, when the user grips the grip section 14 in the second way of gripping and presses the lower surface trigger key 20 by the index finger F2 to perform an ON operation, the optical reading section 6 is driven and the barcode of an article or the like can be favorably read by the laser reading section. In addition, an image of the article to be read by the laser reading section can be captured by the imaging section of the optical reading section 6.

In the above-described embodiment the first finger rest area 15b of the first raised portion 15 and the second finger rest area 16b of the second raised portion 16 provided to the battery cover 10 positioned on the rear surface of the grip section 14 are formed on the curved surface corresponding to a natural curve of the index finger F2 or the middle finger F3 of the hand of the user gripping the grip section 14.

However, the present invention is not limited thereto. For example, these areas may be formed as in a modification example shown in FIG. 8.

Figure 8:
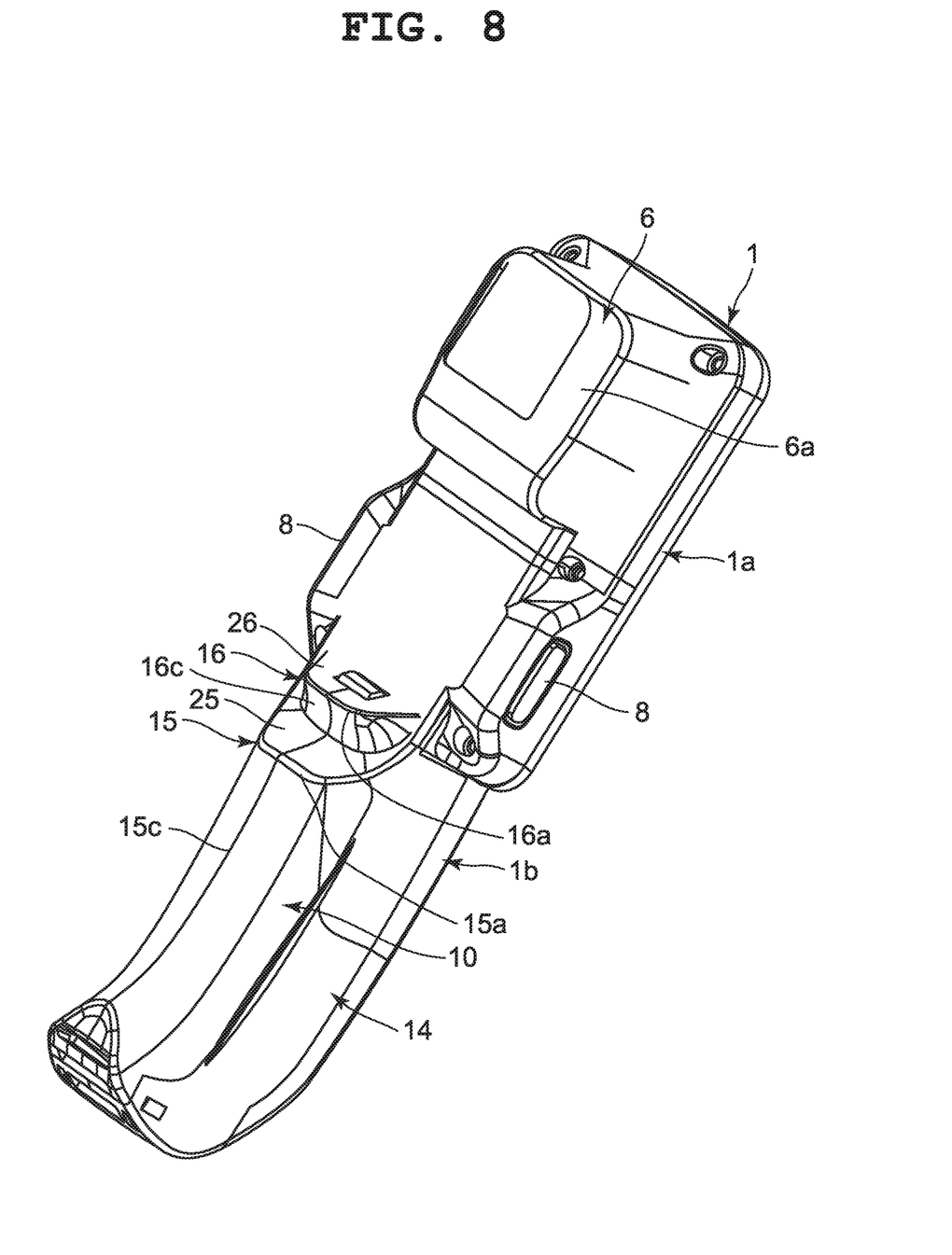
FIG. 8 is a perspective view of a modification example of the portable terminal according to the present invention when viewed from a rear surface side.

In the modification example shown in FIG. 8, a second finger rest area 26 that is a sloped surface area of the second raised portion 16 corresponding to the lower surface trigger key 20 is formed more linearly than the first finger rest area 25 that is a sloped surface of the first raised portion 15 where the index finger F2 is positioned in the gripping style of the first way of gripping which is a standard way of gripping. Even in this case where the second finger rest area 26 of the second raised portion 16 is linearly formed, the mechanism and effects are substantially the same as those of the above-described embodiment.

Also, in the above-described embodiment, the display section 4 and the key operation section 5 are provided on the front surface of the device case 1. However, the present invention is not limited thereto. For example, the key operation section 5 may be an input display section formed of a transparent touch panel and having a display panel laminated thereon.

While the present invention has been described with reference to the preferred embodiments, it is intended that the invention be not limited by any of the details of the description therein but includes all the embodiments which fall within the scope of the appended claims.

What is claimed is:

1. A portable terminal comprising:
a terminal main body having a first end and a second end at opposite ends thereof in a longitudinal direction of the terminal main body and a front side and a back side at opposite sides thereof in a front-back direction which is orthogonal to the longitudinal direction, the terminal main body comprising a first portion that includes the first end and a second portion that includes the second end, and the second portion being configured to be gripped by a hand of a user;
a raised portion provided at the second portion on the back side of the terminal main body, the raised portion including a vertex and a first sloped surface, the vertex projecting outward on the back side, and the first sloped surface sloping away from the vertex and toward the first end of the terminal main body in the longitudinal direction; and
a switch including a pressing target, the switch being provided on the back side of the terminal main body such that the pressing target faces outward from the back side of the terminal main body,
wherein the first sloped surface is positioned between the vertex and the switch in the longitudinal direction,
wherein the pressing target of the switch comprises a second sloped surface which is positioned between the first sloped surface and the first end of the terminal main body in the longitudinal direction,
wherein both the first sloped surface of the raised portion and the second sloped surface of the pressing target slope toward the first end of the terminal main body in the longitudinal direction and inwardly toward the front side of the terminal main body in the front-back direction, and
wherein the first sloped surface is configured to act as a finger rest for a finger of the hand of the user.

2. The portable terminal according to claim 1, further comprising:
a second raised portion provided between the raised portion and the first end of the terminal main body in the longitudinal direction, the second raised portion including a second vertex projecting outward on the back side;

wherein the pressing target of the switch is provided in the second raised portion on a side of the second vertex opposite from a side at which the first sloped surface is located, and the pressing target does not protrude from the second raised portion.

3. The portable terminal according to claim 1, further comprising:

a battery cover which is provided at the second portion on the back side of the terminal main body, wherein the battery cover includes the first raised portion.

4. The portable terminal according to claim 1, further comprising an input operation section which comprises a plurality of keys and is provided at the second portion on the front side of the terminal main body.

5. The portable terminal according to claim 1, wherein the switch is provided at a center portion of the terminal main body in a lateral direction of the terminal main body that is orthogonal to both the longitudinal direction and the front-back direction.

6. The portable terminal according to claim 1, wherein the switch is elongated along a lateral direction of the terminal main body that is orthogonal to both the longitudinal direction and the front-back direction.

7. The portable terminal according to claim 1, further comprising an optical reader provided at the first portion on the back side of the terminal main body.

8. The portable terminal according to claim 7, wherein the optical reader is configured to start a reading operation in response to an operation being performed on the switch.

9. An imaging device comprising:

a terminal main body having a first end and a second end at opposite ends thereof in a longitudinal direction of the terminal main body and a front side and a back side at opposite sides thereof in a front-back direction which is orthogonal to the longitudinal direction, the terminal main body comprising a first portion that includes the first end and a second portion that includes the second end, and the second portion being configured to be gripped by a hand of a user;

an imaging section provided at the first portion on the back side of the terminal main body;

a raised portion provided at the second portion on the back side of the terminal main body, at a position between the second end of the terminal main body and the imaging section in the longitudinal direction, the raised portion including a vertex and a first sloped surface, the vertex projecting outward on the back side, and the first sloped surface sloping away from the vertex and toward the imaging section in the longitudinal direction; and a switch including a pressing target, the switch being provided on the back side of the terminal main body such that the pressing target faces outward from the back side of the terminal main body, wherein the first sloped surface is positioned between the vertex and the switch in the longitudinal direction, wherein the pressing target of the switch comprises a second sloped surface which is positioned between the first sloped surface and the imaging section in the longitudinal direction, wherein both the first sloped surface of the raised portion and the second sloped surface of the pressing target slope toward the imaging section in the longitudinal direction and inwardly toward the front side of the terminal main body in the front-back direction, and wherein the first sloped surface is configured to act as a finger rest for a finger of the hand of the user.

10. The imaging device according to claim 9, further comprising:

a second raised portion provided between the raised portion and the imaging section in the longitudinal direction, the second raised portion including a second vertex projecting outward on the back side;

wherein the pressing target of the switch is provided in the second raised portion on a side of the second vertex opposite from a side at which the first sloped surface is located, and the pressing target does not protrude from the second raised portion.

11. The imaging device according to claim 9, further comprising:

a battery cover which is provided at the second portion on the back side of the terminal main body, wherein the battery cover includes the first raised portion.

12. The imaging device according to claim 9, further comprising an input operation section which comprises a plurality of keys and is provided at the second portion on the front side of the terminal main body.

13. The imaging device according to claim 9, wherein the switch is provided at a center portion of the terminal main body in a lateral direction of the terminal main body that is orthogonal to both the longitudinal direction and the front-back direction.

14. The imaging device according to claim 9, wherein the imaging section is configured to start a reading operation in response to an operation being performed on the switch.

15. A reading device comprising:

a terminal main body having a first end and a second end at opposite ends thereof in a longitudinal direction of the terminal main body and a front side and a back side at opposite sides thereof in a front-back direction which is orthogonal to the longitudinal direction, the terminal main body comprising a first portion that includes the first end and a second portion that includes the second end, and the second portion being configured to be gripped by a hand of a user;

an optical reader provided at the first portion on the back side of the terminal main body;

a raised portion provided at the second portion on the back side of the terminal main body, at a position between the second end of the terminal main body and the optical reader in the longitudinal direction, the raised portion including a vertex and a first sloped surface, the vertex projecting outward on the back side, and the first sloped surface sloping away from the vertex and toward the optical reader in the longitudinal direction; and a switch including a pressing target, the switch being provided on the back side of the terminal main body such that the pressing target faces outward from the back side of the terminal main body, wherein the first sloped surface is positioned between the first vertex and the switch in the longitudinal direction, wherein the pressing target of the switch comprises a second sloped surface which is positioned between the first sloped surface and the optical reader in the longitudinal direction, wherein both the first sloped surface of the raised portion and the second sloped surface of the pressing target slope toward the optical reader in the longitudinal direction and inwardly toward the front side of the terminal main body in the front-back direction, and wherein the first sloped surface is configured to act as a finger rest for a finger of the hand of the user.

16. The reading device according to claim 15, further comprising:

a second raised portion provided between the raised portion and the imaging section in the longitudinal direction, the second raised portion including a second vertex projecting outward on the back side;

wherein the pressing target of the switch is provided in the second raised portion on a side of the second vertex opposite from a side at which the first sloped surface is located, and the pressing target does not protrude from the second raised portion.

17. The reading device according to claim 15, further comprising:

a battery cover which is provided at the second portion on the back side of the terminal main body, wherein the battery cover includes the first raised portion.

18. The reading device according to claim 15, further comprising an input operation section which comprises a plurality of keys and is provided at the second portion on the front side of the terminal main body.

19. The reading device according to claim 15, wherein the switch is provided at a center portion of the terminal main body in a lateral direction of the terminal main body that is orthogonal to both the longitudinal direction and the front-back direction.

20. The reading device according to claim 15, wherein the optical reader is configured to start a reading operation in response to an operation being performed on the switch.

\* \* \* \* \*

UNITED STATES PATENT AND TRADEMARK OFFICE
CERTIFICATE OF CORRECTION

PATENT NO. : 10,929,624 B2
APPLICATION NO. : 16/039603
DATED : February 23, 2021
INVENTOR(S) : Yasunori Chiba et al.

Page 1 of 1

It is certified that error appears in the above-identified patent and that said Letters Patent is hereby corrected as shown below:

In the Claims

Column 17, Line 13 (Claim 3, Line 5), after "the" delete "first".
Column 18, Line 21 (Claim 11, Line 5), after "the" delete "first".
Column 18, Line 60 (Claim 15, Line 27), before "vertex" delete "first".
Column 19, Line 20 (Claim 17, Line 5), after "the" delete "first".

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*